3,525,707
ORGANOPOLYSILOXANE COMPOSITIONS CONTAINING BORON - OXYGEN COMPOUND, PHOSPHOROUS POLYETHER, AND FILLER
William J. Bobear, Latham, N.Y., assignor to General Electric Company, a corporation of New York
No Drawing. Continuation of application Ser. No. 603,114, Dec. 20, 1966. This application Aug. 5, 1969, Ser. No. 849,279
Int. Cl. C08g *5/04;* C08k *1/02*
U.S. Cl. 260—37                      9 Claims

ABSTRACT OF THE DISCLOSURE

Organopolysiloxane compositions are provided comprising a diorganopolysiloxane, a dialkyl-alkylphosphonate, and a boron oxygen compound. The organopolysiloxane compositions also can contain certain phosphorus-containing polyethers. These organopolysiloxane compositions can be employed to make self-bonding insulating tapes.

---

This application is a continuation of application Ser. No. 603,114 filed Dec. 20, 1966, now abandoned, which in turn is a continuation-in-part of application Ser. No. 288,488 filed June 17, 1963, now abandoned, and application Ser. No. 219,106 filed Aug. 24, 1962, also abandoned, all assigned to the same assignee as the present invention.

The present invention relates to organopolysiloxane compositions. More particularly, the present invention relates to organopolyosiloxane compositions useful for making self-bonding insulating tapes.

The employment of organopolysiloxane elastomers as electrical insulators has gained wide acceptance by industry. Insulating tapes in the form of semi-cured organopolysiloxane elastomers, or glass composites thereof, have been used extensively in a variety of electrical applications. Semi-cured tapes are desirable because they can be fused by use of heat and pressure after being applied. More recently self-bonding, or auto-adhering organopolysiloxane tapes, such as taught in British Pat. 859,284, have become available to the art. These self-bonding tapes have an important advantage over semi-cured tapes. Self-bonding tapes can be directly wound onto an exposed electrical conductor, such as in a splicing operation, to form an integral electrical insulator without the use of the extreme conditions required when applying semi-cured tapes.

Although self-bonding tapes have important advantages over semi-cured tapes, experience has shown that after a relatively short shelf-period, such as a month or more, the ability of the tapes to self-bond is substantially diminished. Even if the tapes are wrapped in a material such as cellophane, designed to protect tapes from the effects of exposure to the atmosphere, only slight improvements in shelf stability have been achieved. It would be desirable therefore to be able to provide the art with self-bonding tapes which can be advantageously employed in a variety of electrical insulating applications after an extended shelf-period.

As taught in my above-mentioned copending application, certain phosphonate esters or mixtures thereof, of the formula, (1)                RP(O)(OR')$_2$ where R is selected from monovalent hydrocarbon radicals, and halogenated monovalent hydrocarbon radicals, and R' is selected from alkyl radicals, can be employed to impart improved shelf-life characteristics to cured organopolysiloxane compositions in the form of self-bonding tapes. Included among the organopolysiloxane compositions which can be employed to make such self-bonding tapes, are materials which must be cured at temperatures of about 600° F., i.e., 315° C. Although the heat curable organopolysiloxane compositions, taught in my aforementioned copending application, can be advantageously utilized to make a variety of valuable reinforced self-bonding tapes in the form of glass cloth-silicone elastomer composites, effective results cannot be achieved unless special fabrication techniques are employed. Silicone tape fabricators know for example, that when making tape composites by calendering silicone rubber and glass cloth on conventional equipment, a temperature of 800° F. or higher, often must be employed to maintain a 600° F. cure temperature. As a result of such elevated temperature requirements, conventional equipment and techniques cannot be used for manufacturing reinforced self-bonding tapes in the form of composites of silicon rubber with either glass, woven nylon, or dacron. It has been found that such reinforced composites require special techniques and equipment, which can add to manufacturing costs.

The present invention is based on the discovery that in addition to the valuable results achieved with prior art fusible tape compositions as a result of the employment of phosphonate esters of Formula 1, additional benefits are realized by employing certain "phosphorus-containing polyethers," in combination with such phosphonate esters. Unlike prior art fusible tape compositions requiring cure temperatures of 600° F. or higher to achieve self-bonding characteristics, the compositions included by the present invention, containing the combination of the phosphonate esters of Formula 1, as well as the phosphorous-containing polyether, which will be specifically defined hereinafter, provide for organopolysiloxane compositions convertible to fusible tapes at temperatures as low as 350° F.

In accordance with the present invention there is provided a composition comprising by weight (1) 100 parts of a polymer having the formula, (2)

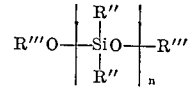

(2) 0.01 to 10 parts of a dialkyl alkylphosphonate, (3) 10 to 300 parts of a filler, (4) 0.01 to 1 part of elemental boron in the form of a boron-oxygen compound, and (5) 0 to 20 parts of a phosphorus-containing polyether, where R" is a member selected from the class consisting of monovalent hydrocarbon radicals, halogenated monovalent hydrocarbon radicals, and cyanoalkyl radicals, R''' is a member selected from the class consisting of hydrogen, alkyl radicals, and Si(R")$_3$ radicals, and $n$ is an integer equal to from 100 to 10,000, inclusive.

Radicals included by R of Formula 1, are aryl radicals, and halogenated aryl radicals such as phenyl, chorophenyl, xylyl, tolyl, etc., aralkyl, radicals such as phenylethyl, benzyl, etc., aliphatic, haloaliphatic and cycloaliphatic such as alkyl, alkenyl, cycloalkyl, haloalkyl, including methyl, ethyl, propyl, vinyl, butyl, chlorobutyl, cyclohexyl, etc.; radicals included by R' of Formula 1 are all of the aforementioned alkyl radicals included by R. Radicals included by R" are all of the aforementioned R radicals, and cyanoalkyl radicals such as cyanoethyl, cyanopropyl, cyanobutyl, etc. Radicals included by R''' are hydrogen, methyl, ethyl, propyl, butyl, pentyl, hexyl, heptyl, octyl, trimethylsilyl, triethylsilyl, dimethylethylsilyl, dimethylphenylsilyl, etc. In the above formulae R and R' are preferably ethyl and butyl, R" is preferably methyl, and R''' is preferably trimethylsilyl.

Some of the phosphonate esters of Formula 1 which can be employed in the practice of the invention are for example, dimethyl methylphosphonate, diethyl ethylphosphonate, diethyl butylphosphonate, dibutyl ethylphosphonate, dibutyl butylphosphonate, dipropyl ethylphosphonate, dimethyl phenylphosphonate, etc.

The boron-oxygen compounds that are operable in the invention are preferably boric acid, $H_3BO_3$ and boron oxides such as $B_2O_3$, $B_2O_2$, $B_4O_5$, etc. Boric acids and esters thereof that can be employed are included by the formula, (4) 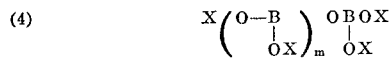

Cyclic organo borates, (5) $(R''OBO)_y$ are also operable, where $m$ is a whole number equal to from 0 to 3, $y$ is an integer equal to from 3 to 5, and X is a member selected from the class of hydrogen and R'' radicals, where R''' radicals are as defined above.

Boron-oxygen compounds included by Formulae 4 and 5 are boric acids such as $H_4B_2O_4$, $H_2B_4O_6$, $H_3BO_3$, $H_2B_4O_7$, $HBO_2$, etc. and esters of boric acid, e.g., alkyl borates such as methyl, ethyl, propyl, isopropyl, butyl, isobutyl, amyl, hexyl, heptyl, etc. borates; aryl borates, e.g., phenyl, tolyl, xylyl, naphthyl, etc. borates; substituted orthoborates, e.g., diethyl phenyl borate, diisobutyl m-tolylborate; cyclic borates such as trimethoxyboroxine, etc.

Included by the phosphorus-containing polyethers which can be employed in the practice of the invention are compounds of the formula, (6) 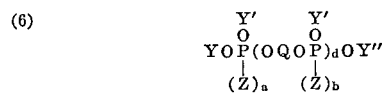

where Y is a member selected from hydrogen, R' radicals, and a residue of a polyalkylene glycol from which one of the hydroxyl radicals has been removed, Y' is selected from Y radicals and Y'' radicals, Y'' is a polyalkylene glycol from which one of the hydroxyl radicals has been removed, and a residue of a polyalkylene glycol having a terminal R radical, R is as previously defined, Q is a residue of a polyalkylene filycol from which both hydroxyl radicals have been removed, Z is a member selected from hydrogen, oxygen, OY' and

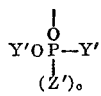

where Z' is selected from hydrogen, oxygen, and OY', $d$ is equal to 0 or an integer having a value of 1 to 100, inclusive, and $a$, $b$ and $c$ are whole numbers having a value of 0 to 1.

The phosphorus-containing polyethers which can be employed in the practice of the invention, can have hydroxyl numbers in the range of between about 35 to about 750. The term "hydroxyl number" as used hereinafter, will designate values expressed in mg. KOH/g. sample. One procedure which can be employed to calculate hydroxyl number is ASTM E222-65T, revised 1965. A preferred technique is shown in Analytical Chemistry, vol. 7, No. 4, p. 600-1, April 1965, utilizing pyromellitic dianhydride in dimethylsulfoxide. Some of the phosphorus-containing polyethers also can be expressed in terms of acid number such as between about 35 to about 750. Acid numbers will hereinafter signify mg. KOH/g. sample when titrated to neutrality as shown in ASTM D1980-61. A modified procedure can be employed when samples are employed which have available hydroxyl radicals attached to carbon as well as phosphorous. This procedure is described in Quantitative Organic Analyses via Functional Groups on p. 23, John Wiley and Sons, Inc., New York, 3rd edition (1963). Separate portions of samples containing free acid or acidic groups on the hydroxyl containing compounds should be titrated with standard KOH at room temperature, using phenolphthalein as indicator, and a suitable correction made in the volume of alkaline solution consumed in the determination of hydroxyl groups.

The phosphorus-containing polyethers are the reaction products of hydroxyl containing polyethers and oxy acids of phosphorus. Suitable oxy acids of phosphorus are shown on pages 640-1 of Inorganic Chemistry by Therald Moeller, John Wiley and Sons, New York (1952). For example, there can be employed pyrophosphorus acid, orthophosphorus acid, hypophosphoric acid, metaphosphoric acids, triphosphoric acid, pyrophosphoric acid, and orthophosphoric acid. Typical of the polyethers which can be utilized are taught on pages 32-44 of Polyurethane Chemistry and Technology, J. H. Saunders and K. C. Fritsch, Interscience Publishers, New York (1962). Polyethers which can be employed can have molecular weights in the range of between about 70 to 5000, and preferably 200 to 2000. They can be made from source materials such as ethyleneoxide, propyleneoxide, tetrahydrofuran, glycerine, etc. Alkyl ether units such as $C_nH_{2n}O$, where $n$ is an integer equal to 2 to 6, inclusive, and preferably 2 to 4, can be present in the polyether.

The phosphorus-containing polyethers can have hydroxy radicals attached to phosphorus atoms, to polyether segments, or both. Some of the phosphorus-containing polyethers which can be employed for example, are shown in Friedman Pat. 3,081,331; 3,265,774; 3,142,651 and 3,139,450.

The polymers of Formula 2 can be chain-stopped with silanol radicals, alkoxy radicals, triorganosilyl radicals, or mixtures thereof. The polymers of Formula 2 also can be utilized in the compositions of the present invention in the form of a mixture of polydiorganosiloxane polymers which are chain-stopped with silanol radicals, alkoxy radicals, triorganosilyl radicals, etc. in which the organo radicals of such polymers are the same as the R radicals of Formula 1.

The polymers of Formula 2 can be prepared by any one of several well known methods. For example, silanol chain-stopped polymers can be made by treating a highly viscous polydiorganosiloxane such as polydimethylsiloxane with water. Highly viscous polydiorganosiloxanes, i.e. polymers having a viscosity between 100,000 to 50,000,000 centipoises at 25° C., can be made for example, by hydrolyzing diorganodichlorosilanes or mixtures of various diorganodichlorosilanes with water, and thereafter condensing the hydrolysis product with either acidic or alkaline catalysts such as hydrochloric acid, sulphuric acid, potassium hydroxide, etc. Alternatively, one may heat cyclic polymers, for instance octamethylcyclotetrasiloxane, included by the formula, (7) 

where $r$ is an integer equal to from 3 to 6, and R'' is as defined above, with an alkaline catalyst such as potassium hydroxide, cesium hydroxide, etc. Mixtures of various cyclic polymers including for example, the aforesaid octamethylcyclotetrasiloxane, octaphenylcyclotetrasiloxane, 1,3,5,7 - tetramethyl - 1,3,5,7 - tetravinylcyclotetrasiloxane, etc. can also be heated in a similar manner with an alkaline catalyst to effect the equilibration of the various diorganosiloxy units. The equilibration can be conducted in the presence of from about 0.001 to 0.1 percent of alkaline catalyst based on the weight of the cyclic polymers of Formula 7, or mixtures thereof at temperatures of from about 125° C. to 175° C. for times ranging from about 15 minutes to 2 hours or more. The alkaline catalyst in the resulting product can thereafter be neutralized with an aqueous mineral acid such as hydrochloric acid to yield a high molecular weight polydiorganosiloxane.

In order to obtain a silanol chain-stopped polymer as shown in Formula 2, such as silanol chain-stopped polydimethylsiloxanes, or a silanol chain-stopped polymer composed of chemically combined dimethylsiloxy units, diphenylsiloxy units, and methylvinylsiloxy units, the aforementioned high molecular weight polydiorganosiloxane can be treated with water to reduce the viscosity of the polymer to a desirable range which can be between 2,000 to 50,000,000 centipoises at 25° C. This can be accomplished by blowing steam across the surface, or through the high molecular weight polymer for a sufficient time to produce the lower viscosity material having the desired silanol content. Such compositions and various methods for preparing the same are more particularly described in U.S. Pat. 2,607,792 and in British Pat. 791,370. The use of steam in this fashion will cause a decrease in the viscosity of the polymer while at the same time the resulting linear polydiorganosiloxane will have terminal silicon bonded hydroxy groups.

A method for making alkoxy chain-stopped polymers is by initially producing an intermediate halogen chain-stopped polydimethylsiloxane, as shown in Patnode Pat. 2,381,366, Hyde Pats. 2,629,726 and 2,902,507. This intermediate can be reacted with an alcohol in the presence of a mild alkali such as sodium bicarbonate. Another procedure involves equilibrating a cyclopolydiorganosiloxane, such as octamethylcyclotetrasiloxane, with a low molecular weight alkoxy chain-stopped polydiorganosiloxane. Methods for making $(R'')_3SiO$ chain-stopped polymers are also well known, such as by equilibrating a cyclopolydiorganosiloxane, as shown by Formula 7, with a hexaorganodisiloxane, octaorganotrisiloxane, etc., where the organo radicals are the same as the R'' radicals of Formula 2. In addition, a hydrolyzate of a diorganodihalosilane or mixture thereof, can be equilibrated with triorganosiloxy units, etc. Other methods are shown in E. G. Rochow, An Introduction to the Chemistry of the Silicones, 2nd edition, New York, John Wiley and Sons, (1951).

Various fillers, or mixtures thereof, can be employed to make the compositions of the invention, such as for example, titanium dioxide, lithopone, zinc oxide, zirconium slicate, silica aerogel, diatomaceous earth, calcium carbonate, fumed silica, precipitated silica, glass fibers, iron oxide etc. The preferred filler is fumed silica because it is particularly useful in insulating applications. The amount of filler used can obviously be varied within wide limits, for instance, from about 10 to about 300 percent by weight of filler based on the weight of the polydiorganosiloxane of Formula 2. In instances where fumed silica is utilized, a proportion of from 20 to 50 parts, per 100 parts of polymer of Formula 2 is preferred. Those skilled in the art known for example, depending upon the particular application intended, the specific type and amount of filler most desirable in any given instance.

Various curing agents and mixtures thereof can also be utilized with the polydiorganosiloxane of Formula 2, along with the filler and other ingredients to convert the resulting composition to the cured, solid, elastic state. Among such curing agents, there can be mentioned for example, benzoyl peroxide, tertiary butyl perbenzoate, bis-(2,4-dichlorobenzoyl)peroxide, dicumyl peroxide, etc. These curing agents can be present in amounts ranging from about 0.1 to as high as 4 to 8 percent, or more, by weight, based on the weight of the polymer. High energy electron irradiation, gamma irradiation, etc. without the employment of a curing agent can also be employed to convert the various mixture of ingredients utilized in forming the self-bonding compositions of the present invention to the solid, elastomeric state.

In forming the self-bonding compositions of the present invention, the polymer, filler, phosphonate ester, phosphorus-containing polyether, etc. can be mixed together in any desired manner. One procedure for example, is to add the filler to the polymer, while the latter is being milled such as on a standard rubber mill. To the resulting mixture, or along with the filler, there can be added suitable ingredients such as the boron-oxygen compound, the phosphonate ester, the phosphorus-containing polyether, and various other ingredients such as structure additives, pigments, etc. In addition, preferably the phosphonate ester is utilized in a proportion of from 0.1 to 5 parts, per 100 parts of polymer. In terms of weight of elemental boron, the boron-oxygen compound is preferably utilized at from 0.07 to 0.7 part, per 100 parts of polymer. In addition, it has been found expedient to utilize an oil of the formula,

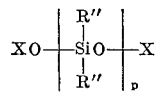

(8)

where R'' and X are as defined above, and $p$ is an integer equal to from 3 to 70, inclusive, and preferably from 5 to 20, inclusive. In Formula 8, R is preferably methyl and X is preferably hydrogen or methyl. When X is methyl the oil can have a methoxy content of from 2 to 30 weight percent and a viscosity of 5 centipoises or less to as high as 50 centipoises or more at 25° C. It also can be utilized at from 1 to 100 parts, per 100 parts of polymer, while it is preferably used at from 5 to 20 parts per 100 parts of polymer. In addition to the aforementioned ingredients, heat stabilizers such as iron oxide, or aryl urethanes can be added in effective amounts such as in proportions of up to 4 parts of heat stabilizer, per 100 parts of polymer.

Addition of the curing catalyst can be performed in any state of the processing but it is often desirable to add it after mixing the polymer of Formula 2 with the filler, boron-oxygen compound, etc.

The resulting curable composition then can be shaped by a conventional extrusion or calendering operation into tapes, including composites with glass cloth, or cloth containing fibers and synthetic fibers such as polyethylene terephthalate. Deposition of the curable composition onto a suitable cloth tape substrate also can be accomplished by dipping procedures, using a solution of the composition in a suitable organic solvent. Suitable organic solvents that can be employed are for example, toluene, benzene, xylene, etc.

The compositions of the present invention can be cured at temperatures within the range of up to 500° C. The time of cure will depend on such factors as the type of curing agent, concentration thereof, temperature utilized, etc. In the absence of the phosphorus-containing polyether, cure of the composition with a peroxide curing agent, can be effected at a temperature between 315° C. to 500° C. for 1 second to 600 seconds. Excessively longer periods of cure at elevated temperatures have been found to adversely affect the self-bonding characteristics of the tape. When utilizing the phosphorus-containing polyether, for example at from 1 to 20 parts, per 100 parts of the polymer of Example 2, and preferably from 2 to 12 parts, cure of the composition can be effected at temperatures as low as 150° C. at 1 second to 600 seconds.

In order that those skilled in the art may be better able to practice the invention, the following examples are given by way of illustration and not by way of limitation. All parts are by weight.

EXAMPLE 1

A silanol chain-stopped polydiorganosiloxane composed of chemically combined dimethylsiloxy units, methylvinylsiloxy units and diphenylsiloxy units was prepared as follows.

There was equilibrated 100 parts of octamethylcyclotetrasiloxane, 15 parts of octaphenylcyclotetrasiloxane, and about ½ part of 1,3,5,7-tetramethyl-1,3,5,7-tetravinyltetrasiloxane with about 0.1 percent KOH catalyst and sufficient water to produce a polymer having a viscosity of about 20,000,000 centipoises at 25° C. To the resulting product there was added a stoichiometric amount of ammonium chloride in the form of an aqueous solution equal to the amount of KOH catalyst utilized in the equilibration reaction. The product was heated and then stripped of volatiles with steam.

There was added to 100 parts of the above-described silanol-stopped polymer, 55 parts of fumed silica, 15 parts of a polydimethylsiloxane silanol chain-stopped oil having about 5 percent silanol and a viscosity of about 20 centipoises at 25° C., 4 parts of red iron oxide and 0.5 part of boric acid, while the resulting mixture was being milled on a standard rubber mill. To the mixture there was then added 2½ parts of a mixture of 2,4-dichlorobenzoyl peroxide in an equal weight of a low molecular weight polydimethylsiloxane oil.

There was added 0.135 part of diethyl ethylphosphonate to 100 parts of the above-described curable mixture, while it was milled. Tapes were prepared from the resulting curable composition by calendering it out to a sheet having a thickness of 20 to 30 mil, and curing the sheet for 15 to 30 seconds at 315° C. Tapes were also prepared following the same procedure from compositions free of the diethyl ethylphosphonate.

The tapes were then tested for ability to self-bond at room temperature after being exposed to the atmosphere for 1 day, 30 days, and 270 days by the following procedure.

A 10″ long tape is wrapped under slight tension around a ¼″ diameter steel rod. After 24 hours the tape is checked to see if it can be unwound. If the tape self-bonds satisfactorily, it cannot be unwound without causing a cohesive tear. A cohesive tear indicates that the rubber has bonded integrally. If the tape does not self-bond, an adhesive tear results, that is, there is a clean separation between sections of the tape without substantial alteration of tape surface.

Table I below shows the self-bonding properties of the tapes in terms of the type of tear resulting after the stated period of exposure on the shelf. In Table I "Alkylphosphonate" indicates the presence of diethyl ethylphosphonate.

TABLE I

| Alkylphos- | Type of tear | | |
| phonate | 1 day | 30 days | 270 days |
| --- | --- | --- | --- |
| Yes | Cohesive | Cohesive | Cohesive. |
| No | do | Adhesive | Adhesive. |

EXAMPLE 2

A self-bonding composition was prepared following the procedure of Example 1, composed of 100 parts of the same silanol-stopped polymer, 55 parts of fumed silica treated with octamethylcyclotetrasiloxane, 15 parts of a silanol-stopped polydimethylsiloxane oil having a viscosity of 20 to 30 centipoises, 4 parts of iron oxide, ½ part of boric acid, and 0.25 part of dibutyl butylphosphonate.

Tapes were prepared from the above composition. Tapes also were prepared by the same procedure free of dibutyl butylphosphonate. The various tapes were cured at 315° C. for 15 to 30 seconds. The tapes were measured for self-bonding characteristics after 1 day, 30 days, and 270 days. A cohesive tear resulted after 270 days with the tapes made in accordance with the practice of the invention. The tapes free of dibutyl butylphosphonate did not self-bond satisfactorily when tested after 30 days exposure.

The above tape compositions were also press-cured for 10 minutes at 250° C. and heat-aged for 24 hours at 250° C. The following table shows the results of physical testing where "H" is hardness (Shore A), "T" is tensile (p.s.i.) and "E" is elongation (percent).

TABLE II

| Alkyl- | Press cured 10 min., 250°C. | | | Heat-aged 24 hrs., 250°C. | | |
| phospho-nate | H | T | E | H | T | E |
| --- | --- | --- | --- | --- | --- | --- |
| Yes | 40 | 960 | 800 | 60 | 970 | 660 |
| No | 45 | 1,000 | 800 | 70 | 550 | 400 |

Tapes made by the practice of the invention were also measured for dielectric strength, volume resistivity, power factor, etc. As shown in Table III, the tapes containing the dibutyl butylphosphonate were found to be as good in all respects as standard electrical insulating silicone tapes.

TABLE III

Electric strength [1] _____ 680
Dissipation factor/60 c.p.s. _____ .003
Dielectric constant/60 c.p.s. _____ 3.5
Vol. resistivity/ohm/cm. _____ $4 \times 10^{15}$

[1] 1″ electrode under 10C oil, 0.5 kilovolt/sec. use.

EXAMPLE 3

A mixture of 100 parts of octamethylcyclotetrasiloxane, 0.23 part of 1,3,5,7-tetramethyl-1,3,5,7-tetravinyltetrasiloxane, 0.059 part of octamethyltrisiloxane and 0.001 part of KOH was equilibrated at a temperature between 150° C. to 195° C. until a polymer was produced having a viscosity of about 20 million centipoises at 25° C. This polymer was composed of chemically combined dimethylsiloxy units and methylvinylsiloxy units, and chain-stopped with trimethylsiloxy units.

There was added to 100 parts of the above-described trimethylsiloxy-stopped polymer, 50 parts of fumed silica, 12 parts of a methoxy chain-stopped polydimethylsiloxane oil having a viscosity of about 15 centipoises, 4 parts of red iron oxide, 7 parts of triethyl borate, and 0.6 part of dibutyl butylphosphonate, while the resulting mixture was being milled on a standard rubber mill. To the resulting milled mixture there was then added 3 parts of a mixture composed of equal proportions by weight of dicumyl peroxide and a mixture of 2,4-dichlorobenzoyl peroxide in an equal weight of a low molecular weight polydimethylsiloxane oil.

Tapes were prepared from the resulting composition by calendering it to a sheet having a thickness of about 20 to 30 mils in accordance with the procedure of Example 1. Tapes were also made following the above procedure except that no dibutyl butylphosphonate was utilized. The various tapes were then cured at 315° C. for 15 to 30 seconds.

The tapes were then tested for self-bonding after exposure to the atmosphere at room temperature, for 1 day, 30 days and 270 days as shown in Example 1. It was found that the tapes made by the practice of the invention exhibited a cohesive tear after 270 days' exposure, while the tapes free of dibutyl butylphosphonate failed in less than 30 days. In addition to the above tests, the tapes containing the dibutyl butylphosphonate were also found to exhibit substantially the same electrical properties as shown above in Table III, and substantially the same physical properties as shown in Table II.

EXAMPLE 4

A trimethylsiloxy terminated polydiroganosiloxane consisting essentially of chemically combined dimethylsiloxy units and methylvinylsiloxy units having a viscosity of about 20,000,000 centipoises at 25° C., was milled with 50 parts of fumed silica, 12 parts of a methoxy chain-stopped polydimethylsiloxane oil having a viscosity of about 15 centipoises, 4 parts of red iron oxide, 7 parts of triethyl borate, and 0.6 part of dibutyl butylphosphonate. The aforementioned mixture was then further milled with 10 parts of a phosphorous-containing polyether within the scope of Formula 6 having the following typical properties:

Molecular weight _____ 532
Hydroxyl number _____ 212
Functionality _____ 2
Viscosity at 25° C. (centipoises) _____ 250

Its elemental analysis showed (percent): C, 46.92; H, 8.61; P, 11.35; O, 33.12.

Tapes were prepared from the above composition by calendering it to a sheet having a thickness of about 20 to 30 mils in accordance with the procedure of Example 1.

9

Tapes were also made from the same composition which did not contain the phosphorous-containing polyether. The various tapes were then cured at about 170° C. for 30 seconds.

Each of the tapes was then tested for self-bonding characteristics in accordance with the procedure of Example 1, utilizing a ¼" diameter steel rod. It was found that the tapes that contained the phosphorus-containing polyether exhibited excellent tack, as well as all of the other desirable characteristics exhibited by the cured tapes described in the previous examples. Tapes free of the phosphorus-containing polyether however, did not fuse. They became unraveled as soon as the tension was removed from the steel bar.

EXAMPLE 5

The procedure of Example 4, was repeated except that there was utilized 2 parts of a phosphorus-containing polyether having the average formula,

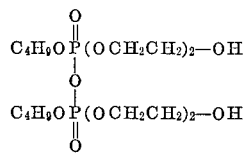

per 100 parts of the trimethylsiloxy-terminated polydiorganosiloxane. It was found that the tape did not unravel when tested on the steel bar in accordance with the procedure of Example 4.

EXAMPLE 6

There was milled 100 parts of the trimethylsiloxy chain-stopped polydiorganosiloxane of Example 4, with 55 parts of fumed silica, 15 parts of a polydimethylsiloxane silanol chain-stopped oil having about 5 percent silanol and a viscosity of about 20 centipoises at 25° C., 4 parts of red iron oxide, 0.5 part of boric acid, 10 parts of diethylethylphosphonate and 2.5 parts of a mixture of 2,4-dichlorobenzoyl peroxide in an equal weight of a low molecular weight polydimethylsiloxane oil. Tapes were prepared from the resulting curable compositions by calendering it to a sheet having a thickness of 20 to 30 mils, and curing the sheet for 15 to 30 seconds at 300° C. The tapes were then tested for ability to self-bond at room temperature after being exposed to the atmosphere after an extended period of time. It was found that the self-bonding characteristics of the tape were substantially the same as that shown in Example 3.

EXAMPLE 7

The procedure of Example 6 was repeated, except that there was utilized 5 parts of diethyl ethylphosphonate, and 4 parts of the phosphorus-containing polyether of Example 4, per 100 parts of the trimethylsiloxy chain-stopped polydiorganosiloxane. It was found that the resulting tape did not unravel when wrapped on a steel bar, in accordance with the procedure of Example 4, after it had been cured for 15 to 30 seconds at 170° C.

EXAMPLE 8

There was milled a mixture of 100 parts of a trimethylsiloxy-terminated polydiorganosiloxane consisting essentially of chemically combined dimethylsiloxy units and methylvinylsiloxy units having a viscosity of about 20 million centipoises at 25° C., 50 parts of fumed silica, 12 parts of a methoxy chain-stopped polydimethylsiloxane oil as shown in Example 4, 4 parts of iron oxide, 7 parts of triethyl borate, 0.6 part of dibutyl butylphosphonate, and 20 parts of the phosphorus-containing polyether of Example 4.

A tape was made of the above composition by calendering it to a sheet having a thickness of 20 to 30 mils. The tape was cured 15 to 30 seconds at 170° C. It was found that the tape did not unravel when tested on the steel bar in accordance with the procedure of Example 4.

10

EXAMPLE 9

There was milled 100 parts of a trimethylsiloxy with 50 parts of fumed silica, 12 parts of a methoxy chain-stopped polydimethylsiloxane oil, 4 parts of red iron oxide, 7 parts of triethyl borate, and 0.6 part of dibutyl butylphosphonate and 7 parts of a phosphorus-containing polyether having a molecular weight of about 1400 in the form of a diester of orthophosphoric acid having an acid number of 57 and substituted with alkyleneoxide segments consisting of an average of about six chemically combined ethyleneoxide and propylene oxide units, and terminated with phenoxy radicals.

Tapes were made in accordance with the procedure of Example 4, and it was found that a satisfactory degree of tack was achieved after they cured up to 30 seconds at 170° C.

EXAMPLE 10

The procedure of Example 9 is repeated except that there is utilized 7 parts of a phosphorous-containing polyether which is made by reacting orthophosphoric acid and a polyethylene glycol having an average molecular weight of about 500. The resulting product has a hydroxyl number of 300 and contains approximately 11% by weight of phosphorus. Tapes made in accordance with the procedure of Example 4 show a satisfactory tack after they are cured at 170° C. for 30 seconds.

EXAMPLE 11

There is added 10 parts of a phosphorous-containing polyether having a hydroxyl number of about 50 in the form of a phosphorus acid ester of a tris(sorbitol-propylene oxide) adduct of phosphorus acid having a molecular weight of about 3,000, to a trimethylsiloxy-terminated polydiorganosiloxane consisting essentially of chemically combined dimethylsiloxy units and methylvinylsiloxy units having a viscosity of about 20 million centipoises at 25° C., 50 parts of fumed silica, 12 parts of a methoxy chain-stopped polydimethylsiloxane having a viscosity of about 15 centipoises, 4 parts of red iron oxide, 11 parts of triethyl borate, and 0.6 part of dibutyl butylphosphonate. The mixture is milled on a rubber mill and then formed into a sheet. Tapes are cut from the sheet and then cured at 170° C. for 30 seconds. It is found that the cured tapes do not unravel after being wound onto a ¼" steel bar in accordance with the procedure of Example 4.

EXAMPLE 12

The procedure of Example 11 is repeated, except there is utilized as the phosphorus-containing polyether, 10 parts of a material having the average formula,

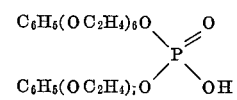

It is found that the resulting tape made in accordance with the procedure of Example 11, does not unravel when tested on the steel bar.

While the foregoing examples have of necessity been limited to only a few of the very many variables within the scope of the present invention, it should be understood that the present invention covers a much broader class of organopolysiloxane compositions comprising the organopolysiloxane polymers of Formula 2, the phosphonate esters of Formula 1, filler, boron-oxygen compounds shown by Formulas 4 and 5, as well as up to 20 parts of the phosphorus-containing polyether of Formula 6.

What I claim as new and desire to secure by Letters Patent of the United States is:

1. A composition comprising by weight (1) 100 parts of a polymer having the formula,

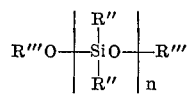

(2) 0.01 to 10 parts of a dialkyl alkylphosphonate of the formula, $$RP(O)(OR')_2$$

(3) 10 to 300 parts of a filler, (4) 0.01 to 1 part of elemental boron in the form of a boron-oxygen compound, and (5) 1 to 20 parts of a phosphorus-containing polyether having the average formula,

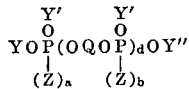

where R is selected from the class consisting of monovalent hydrocarbon radicals, and halogenated monovalent hydrocarbon radicals, R' is selected from alkyl radicals, R'' is a member selected from the class consisting of monovalent hydrocarbon radicals, halogenated monovalent hydrocarbon radicals, and cyanoalkyl radicals, R''' is a member selected from the class consisting of hydrogen, alkyl radicals and $Si(R'')_3$ radicals, Y is a member selected from hydrogen, R' radicals and a residue of a polyalkylene glycol from which one of the hydroxyl radicals has been removed, Y' is selected from Y radicals and Y'' radicals, Y'' is a polyalkylene glycol from which one of the hydroxyl radicals has been removed, and a residue of a polyalkylene glycol having a terminal R radical, Q is a residue of a polyalkylene glycol from which both hydroxyl radicals have been removed, Z is a member selected from hydrogen, oxygen, OY'

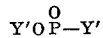

Z' is selected from hydrogen, oxygen and OY', $a$, $b$ and $c$ are whole numbers having a value of 0 or 1, $d$ is a whole number equal to 0, or 1 to 100, inclusive, and $n$ is an integer equal to 100 to 10,000, inclusive.

2. A composition in accordance with claim 1, containing from 1 to 100 parts of an organopolysiloxane of the formula,

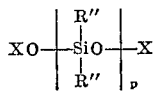

per 100 parts of the organopolysiloxane polymer, where R'' is selected from the class consisting of monovalent hydrocarbon radicals, halogenated monovalent hydrocarbon radicals, and cyanoalkyl radicals, X is a member selected from the class of hydrogen and alkyl radicals, and $p$ is an integer equal to from 3 to 70, inclusive.

3. A composition in accordance with claim 1, in which the phosphorus-containing polyether has a hydroxyl number in the range of about 35 to 750, inclusive.

4. A composition in accordance with claim 1, in which the phosphorus-containing polyether has an acid number in the range of about 35 to about 750, inclusive.

5. A composition in accordance with claim 1, in which the polymer is chain-stopped with $Si(R'')_3$ radicals, where R'' is selected from monovalent hydrocarbon radicals, halogenated monovalent hydrocarbon radicals, and cyanoalkyl radicals.

6. A composition in accordance with claim 1, comprising by weight (1) 100 parts of a polymer having the formula,

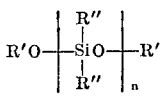

(2) 0.1 to 10 parts of a member selected from the class consisting of dibutyl butylphosphonate and diethyl ethylphosphonate (3) 1 to 100 parts of a polymer having the formula,

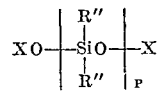

which has a viscosity of from 5 to 50 centipoises at 25° C. (4) from 0.01 to 1 part of elemental boron in the form of a member selected from the class consisting of boric acid, and triethyl borate (5) from 10 to 300 parts of a filler, and (6) from 2 to 12 parts of the phosphorus-containing polyether, where R is a member selected from the class consisting of monovalent hydrocarbon radicals, halogenated monovalent hydrocarbon radicals, and cyanoalkyl radicals, R' is a member selected from the class consisting of hydrogen and an alkyl radical, and an $$-Si(R'')_3$$

radical, R'' is a member selected from the class consisting of monovalent hydrocarbon radicals, halogenated monovalent hydrocarbon radicals, and cyanoalkyl radicals, X is a member selected from the class consisting of hydrogen and an alkyl radical, $n$ is an integer equal to from 100 to 10,000, inclusive, and $p$ is an integer equal to from 3 to 70, inclusive.

7. A composition in accordance with claim 1, in which the phosphorus-containing polyether has the following typical properties:

| | |
|---|---|
| Molecular weight | 532 |
| Hydroxyl number | 212 |
| Weight percent phosphorus | 11.35 |
| Viscosity at 25° C. (centipoises) | 250 |

8. A composition in accordance with claim 1, in which the phosphorus-containing polyether has the average formula,

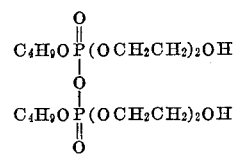

9. A composition in accordance with claim 1, in which the phosphorus-containing polyether has the average formula,

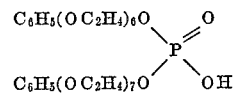

References Cited

UNITED STATES PATENTS

| 2,721,857 | 10/1955 | Dickman. |
| 2,739,952 | 3/1956 | Linville _____ 260—45.75 X |
| 3,146,799 | 9/1964 | Fekete. |

FOREIGN PATENTS

| 859,284 | 1/1961 | Great Britain. |

MORRIS LIEBMAN, Primary Examiner

L. T. JACOBS, Assistant Examiner

U.S. Cl. X.R.

260—46.5